United States Patent
Erwin

(10) Patent No.: US 7,126,964 B1
(45) Date of Patent: Oct. 24, 2006

(54) METHOD AND APPARATUS FOR NETWORK ANALYSIS, SUCH AS ANALYZING AND CORRELATING IDENTIFIERS OF FRAME RELAY CIRCUITS IN A NETWORK

(75) Inventor: Jeff B. Erwin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 896 days.

(21) Appl. No.: 09/780,579

(22) Filed: Feb. 9, 2001

Related U.S. Application Data

(60) Provisional application No. 60/181,954, filed on Feb. 11, 2000.

(51) Int. Cl.
- H04L 12/28 (2006.01)
- H04J 1/16 (2006.01)
- G08C 15/00 (2006.01)
- G06F 11/00 (2006.01)
- G01R 31/08 (2006.01)

(52) U.S. Cl. .................. 370/449; 370/252; 370/389; 370/401; 709/220; 709/232

(58) Field of Classification Search .............. 370/254, 370/255, 225–227, 228, 229–252, 352–396, 370/400–468; 709/218–229, 242, 252
See application file for complete search history.

(56) References Cited

U.S. PATENT DOCUMENTS

| | | | |
|---|---|---|---|
| 5,615,323 A | | 3/1997 | Engel et al. |
| 5,732,218 A | * | 3/1998 | Bland et al. ............... 709/224 |
| 5,751,964 A | * | 5/1998 | Ordanic et al. ............. 709/224 |
| 5,768,271 A | * | 6/1998 | Seid et al. .................. 370/389 |
| 5,790,806 A | * | 8/1998 | Koperda ..................... 709/252 |
| 5,872,928 A | * | 2/1999 | Lewis et al. ................ 709/222 |
| 6,115,362 A | * | 9/2000 | Bosa et al. .................. 370/248 |
| 6,118,759 A | * | 9/2000 | Ohyoshi et al. ............. 370/229 |
| 6,208,640 B1 | * | 3/2001 | Spell et al. .................. 370/358 |
| 6,243,756 B1 | * | 6/2001 | Whitmire et al. ........... 709/232 |
| 6,360,261 B1 | * | 3/2002 | Boyd et al. ................. 709/224 |
| 6,381,641 B1 | * | 4/2002 | Iwasaki ....................... 709/224 |
| 6,421,319 B1 | * | 7/2002 | Iwasaki ....................... 370/230 |
| 6,459,700 B1 | * | 10/2002 | Hoang ......................... 370/401 |
| 6,606,316 B1 | * | 8/2003 | Albert et al. ................ 370/389 |
| 6,631,119 B1 | * | 10/2003 | Mawhinney et al. ........ 370/252 |
| 6,732,085 B1 | * | 5/2004 | Mozes ........................... 707/2 |
| 6,751,226 B1 | * | 6/2004 | Schow ......................... 370/409 |
| 2002/0018473 A1 | * | 2/2002 | Hassell et al. ............ 370/395.1 |
| 2002/0055988 A1 | * | 5/2002 | Crooks ........................ 709/220 |
| 2004/0117478 A1 | * | 6/2004 | Triulzi et al. ............... 709/224 |

* cited by examiner

*Primary Examiner*—Man U. Phan
(74) *Attorney, Agent, or Firm*—Perkins Coie LLP

(57) ABSTRACT

A system, method or facility allow a user to analyze a telecommunications network having virtual private network segments, such as frame relay circuits, where standard network analysis tools fail to identify such circuits. The facility receives identifiers or addresses for such circuits and gathers statistical data with respect thereto. Based on such statistical data, the facility matches end points of the circuits with corresponding starting points. Thus, a network designer or manager may use standard and less expensive hardware in networks employing frame relay circuits, and other virtual private network segments, by employing the facility to fully document and verify the overall configuration of the network environment, without prior knowledge of the network's makeup.

23 Claims, 3 Drawing Sheets

METHOD AND APPARATUS FOR NETWORK ANALYSIS, SUCH AS ANALYZING AND CORRELATING IDENTIFIERS OF FRAME RELAY CIRCUITS IN A NETWORK

CROSS REFERENCE TO RELATED APPLICATION

This application claims benefit of priority to U.S. Provisional Application No. 60/181,954, entitled, "METHOD AND APPARATUS FOR NETWORK ANALYSIS, SUCH AS ANALYZING AND CORRELATING IDENTIFIERS OF FRAME RELAY CIRCUITS IN A NETWORK," filed Feb. 11, 2000.

TECHNICAL FIELD

The invention relates generally to analyzing networks. More specifically, the invention relates to the mapping of frame relay circuits in computer networks.

BACKGROUND OF THE INVENTION

Network managers and other technology specialists must often manage complex networks. These networks include numerous components such as switches, routers, gateways and terminating equipment such as work stations, personal computers (PCs), servers, and the like.

Some computer software systems exist to analyze and diagram elements of a network. Examples of such systems are Visio Enterprise™ by Visio Corporation and OpenView™ by Hewlett-Packard Corporation. These systems analyze a network to create a database that logically represents the various components in the network. These systems can then create a diagram of that network using the database.

Certain network components or circuits are particularly difficult to analyze, such as frame relay circuits. Frame relay circuits employ specialized devices, known as frame relay access devices (FRADs) that encapsulate any native protocol data unit (PDU). Thus, frame relay circuits can encapsulate various size data packets associated with any native PDU and packetize it for transmission over permanent virtual circuits (PVCs). PVCs are predetermined paths specifically defined in frame relay routing logic. Telecommunication service providers favor frame relay circuits since they can provide numerous subscribers to their telecommunication networks without adding additional infrastructure. Frame relay circuits are typically intended for data communication applications especially for networking local area networks (LANs) where data transmissions are bursty.

When analyzing a network containing frame relay circuits, the above software systems simply discover data link connection identifiers (DLCIs), also known as data link circuit identifiers. DLCIs are 10-bit portions of address fields prepended to each frame transmitted along predetermined frame relay circuits. For example, if a device identified and analyzed under the Visio Enterprise System identifies a router having frame relay capability, the system identifies the particular port of the router having frame relay capability and identifies individual DLCIs associated with that port. Each DLCI can be thought of as a single direction pipe. Data may flow into or out of the pipe. Thus, each DLCI defines either a front end of the pipe or a back end. Each frame relay port is attached, through a public switched network to another frame relay port, somewhere else in the world, with each port having unique DLCIs.

Each router port, having one or more associated DLCI, has no information about the other end of the frame relay circuit; the other end is the other frame relay port on another router somewhere in the network. Since neither router has information identifying the other router, the above software systems cannot determine which DLCIs are connected to other DLCIs within the network.

Network managers typically must know the DLCI connection pairs for diagnostic and usage purposes. Therefore, if the network includes frame relay circuits, then the network manager typically must rely on data from the frame relay circuit providers, or purchase proprietary frame relay hardware (FRADs), which is more expensive and less common than standard router hardware. The FRADs, or "probes", are capable of analyzing frame relay circuits, but the network manager must continue to use such expensive hardware in the future if additional frame relay circuits are added, or purchase improved hardware if increased functionality is desired.

SUMMARY OF THE INVENTION

The present invention solves the above problems of how to determine matching DLCIs of frame relay circuits. More specifically, the present invention allows a user to analyze a telecommunications network having virtual private network segments, such as frame relay circuits, where standard network analysis tools fail to identify such segments. Standard network discovery tools identify segments such as frame relay circuits, but provide no information about which circuits are connected to each other. The present invention comprises a facility that can gather statistical data with respect to frame relay circuits. Based on such statistical data, the facility can match end points of the circuits with corresponding starting points. Thus, a network designer or manager can use standard and less expensive hardware in networks employing frame relay circuits, and other virtual private network segments, by employing the facility of the present invention to fully document and verify the overall configuration of the network environment, without prior knowledge of the network's makeup.

The network analysis facility of the present invention can allow automated analysis of networks such as networks having frame relay circuits. A network is typically comprised of nodes or components coupled together by segments or circuits. During network interrogation, a logical model can be created and stored, which can comprise various connected elements that represent the network's components and their interconnections. The facility of the present invention can identify segment addresses of virtual private network segments in the network where pairs of segment addresses define individual virtual private network segments. The facility can obtain statistical data associated with each identified segment address in the network and can analyze the obtained statistical data to identify similar statistical data corresponding to pairs of segment addresses.

More specifically, the facility of the present invention can employ several inverse pairs of statistics to create statistical fingerprints for each DLCI. The inverse pairs of statistics can reduce the possibility of random matches between unmatched DLCIs. Typically, the core statistics at one end of a DLCI will match the inverse core statistics at the other end of the circuit indicating a match. For example, one DLCI can report 2.43 megabytes transmitted while another DLCI can report the same or similar number of bytes received during the polling interval. Similarly, the same DLCI can reports three send errors, while the other DLCI can report three receive errors. The facility of the present invention can initially assume that the number of bytes sent down one end of the frame relay circuit (associated with one DLCI) will usually closely match the number of bytes coming out or received at the other end (associated with another DLCI), taking into account data loss through the public switch telephone network. Likewise, the facility of the present invention can assume the number of errors received at one end of the DLCI will match the number of send errors at the other DLCI.

The facility of the present invention can employ one or more thresholds to assist in determining matches between statistical fingerprints for DLCIs. For example, the facility can permit a match of DLCIs despite differences in transmitted/received bytes of plus or minus one kilobyte or differences in plus or minus one send/receive error for send/receive error statistics.

The facility can also perform at least one verification step. The facility of the present invention can poll the suspected DLCI pair in sequence to (or adjacent in time) to obtain data from appropriate counters as contemporaneously as possible. By obtaining data from appropriate counters as contemporaneously as possible, the facility can help eliminate statistical skew that can occur between respective pairs of DLCIs. For example, to obtain a first match between a pair of DLCIs, facility of the present invention can employ a first polling period of a first duration. In the verification step, the facility of the present invention can employ a second polling period of second duration which is substantially shorter than the first polling period of the first duration. In this way, a skew time interval comprising the time period between the polling of DLCIs of a DLCI pair can be reduced to as close to zero as possible.

BRIEF DESCRIPTION OF THE DRAWINGS

In the drawings, identical reference numbers identify similar elements or steps. For ease in identifying the discussion of any particular element or step, the most significant digit or digits in a reference number refer to the Figure number in which that element is first introduced (e.g., element 204 is first introduced and discussed with respect to FIG. 2).

DETAILED DESCRIPTION

A network analysis facility, and in particular, an apparatus and related method for analyzing telecommunications networks having virtual private network segments, is described in detail herein. In the following description, numerous specific details are provided, such as specific network data, steps, etc., to provide a thorough understanding of embodiments of the invention. One skill in the relevant art, however, will recognize that the invention can be practiced without one or more of these specific details, or with data, steps, etc. In other instances, well-known structures or operations are not shown, or not described in detail, to avoid obscuring aspects of the invention.

Figure 1:
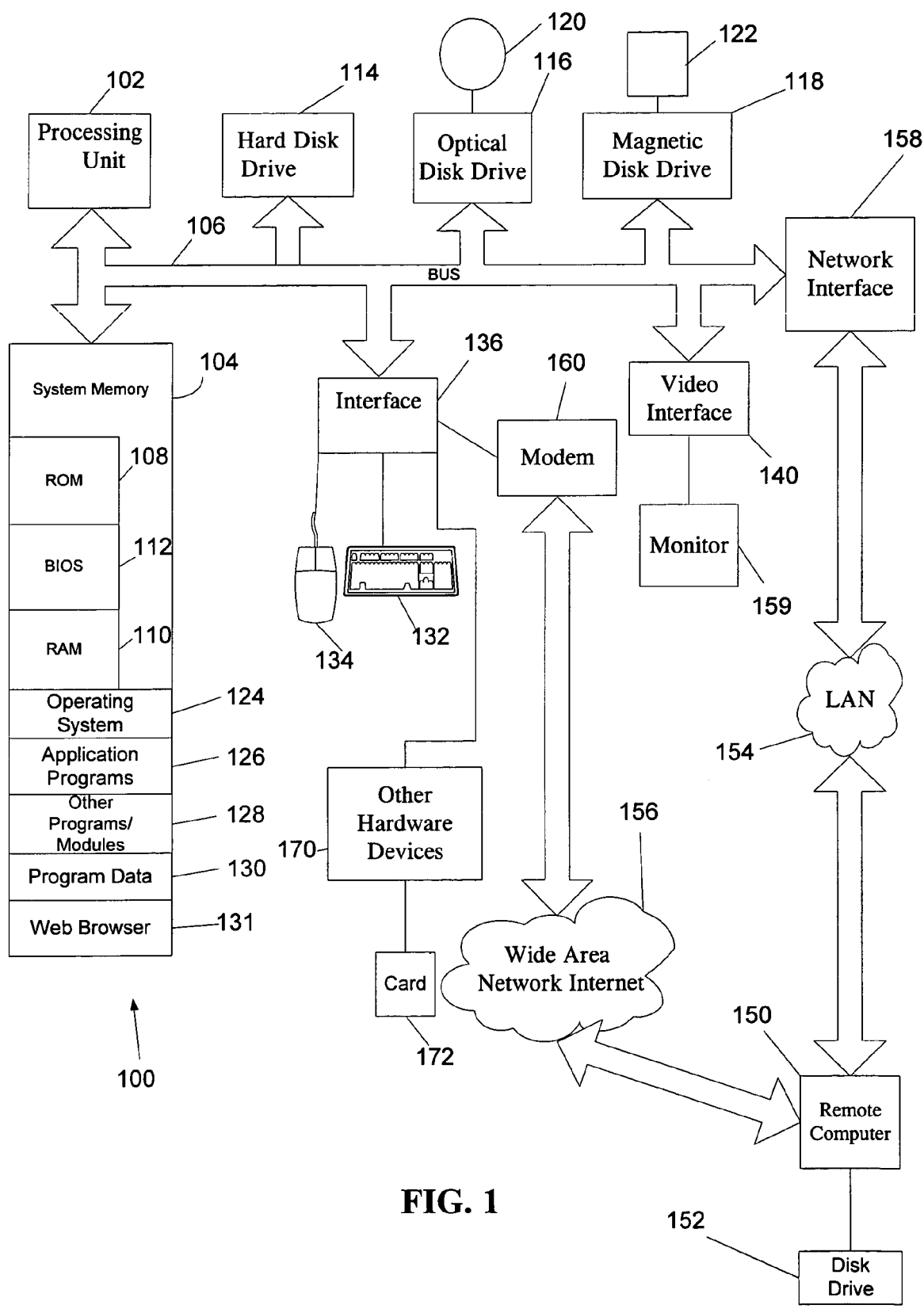
FIG. 1 is a high-level block diagram of a general-purpose computer system upon which an inventive facility executes.

FIG. 1 and the following discussion provide a brief, general description of a suitable computing environment in which the invention can be implemented. Although not required, embodiments of the invention will be described in the general context of computer-executable instructions, such as program modules being executed by a personal computer. Those skilled in the relevant art will appreciate that the invention can be practiced with other computer system configurations, including hand-held devices, multi-processor systems, microprocessor-based or programmable consumer electronics, network PCs, mini computers, mainframe computers, and the like. The invention can be practiced in distributed computing environments where tasks or modules are performed by remote processing devices, which are linked through a communications network. In a distributed computing environment, program modules may be located in both local and remote memory storage devices.

Referring to FIG. 1, a conventional personal computer 100 includes a processing unit 102, a system memory 104 and a system bus 106 that couples various system components including the system memory to the processing unit. The processing unit 102 may be any logic processing unit, such as one or more central processing units (CPUs), digital signal processors (DSPs), application-specific integrated circuits (ASIC), etc. Unless described otherwise, the construction and operation of the various blocks shown in FIG. 1 are of conventional design. As a result, such blocks need not be described in further detail herein, as they will be readily understood by those skilled in the relevant art.

The system bus 106 can employ any known bus structures or architectures, including a memory bus with memory controller, a peripheral bus, and a local bus. The system memory 104 includes read-only memory ("ROM") 108 and random access memory ("RAM") 110. A basic input/output system ("BIOS") 112, which can form part of the ROM 108, contains basic routines that help transfer information between elements within the personal computer 100, such as during start-up.

The personal computer 100 also includes a hard disk drive 114 for reading from and writing to a hard disk (not shown), and an optical disk drive 116 and a magnetic disk drive 118 for reading from and writing to removable optical disks 120 and magnetic disks 122, respectively. The optical disk 120 can be a CD-ROM, while the magnetic disk 122 can be a magnetic floppy disk. The hard disk drive 114, optical disk drive 116 and magnetic disk drive 118 communicate with the processing unit 102 via the bus 106. The hard disk drive 114, optical disk drive 116 and magnetic disk drive 118 may include interfaces or controllers (not shown) coupled between such drives and the bus 106, as is known by those skilled in the art. The drives 114, 116 and 118, and their associated computer-readable media, provide nonvolatile storage of computer readable instructions, data structures, program modules and other data for the personal computer 100. Although the depicted personal computer 100 employs a hard disk, optical disk 120 and magnetic disk 122, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 104, such as an operating system 124, one or more application programs 126, other programs or modules 128 and program data 130. The system memory 104 may also include a web browser 131 for permitting the personal computer 100 to access and exchange data with web sites in the World Wide Web of the Internet. The application programs 126 include network analysis facilities or applications as described below. Information on network analysis software applications can be found, for example, in U.S. patent application Ser. Nos. 09/305,859 and 09/305,851, entitled "Updating Diagrams of Dynamic Representational Models of Dynamic Systems" and "Diagramming Real-World Models Based on the Interrogation of a Database, Such as Models of a Computer Network," all respectively, both filed on May 5, 1999 and assigned to Visio Corporation, and in *Using Visio Enterprise*, User Manual, 1998, by Visio Corporation. While shown in FIG. 1 as being stored in the system memory 104, the operating system 124, application programs 126, other modules 128, program data 130 and web browser 138 can be stored on the hard disk of the hard disk drive 114, the optical disk 120 of the optical disk drive 116 and/or the magnetic disk 122 of the magnetic disk drive 118.

A user can enter commands and information into the personal computer 100 through input devices such as a keyboard 132 and a pointing device such as a mouse 134. Other input devices (not shown) can include a microphone, joystick, game pad, scanner, etc. These and other input devices are connected to the processing unit 102 through an interface 136 such as a serial port interface that couples to the bus 106, although other interfaces such as a parallel port, game port or universal serial bus ("USB") can be used. For example, other hardware devices 170, such as a PCMCIA reader that receives a card 172, can be coupled to the interface 136. A monitor 138 or other display device is coupled to the bus 106 via a video interface 140, such as a video adapter. The personal computer 100 can include other output devices, such as speakers, printers, etc.

The personal computer 100 can operate in a networked environment using logical connections to one or more remote computers, such as a remote computer 150. The remote computer 150 can be another personal computer, a server, a router, a network PC, a peer device or other common network node, and typically includes many or all of the elements described above for the personal computer 100. Typically, the remote computer 150 includes a memory storage device such as a disk drive 152 shown in FIG. 1. The remote computer 150 is logically connected to the personal computer 100 under any known method of permitting computers to communicate, such as through a local area network ("LAN") 154 or a wide area network ("WAN") or Interact 156. Such networking environments are well known in offices, enterprise-wide computer networks, Intranets and the Internet.

In a LAN networking environment, the personal computer 100 is connected to the LAN 154 through an adapter or network interface 158 (coupled to the bus 106). When used in a WAN networking environment, the personal computer 100 often includes a modem 160 or other device for establishing communications over the WAN/Internet 156. The modem 160 is shown in FIG. 1 as coupled between the interface 136 and the WAN/Internet 156. In a networked environment, program modules, application programs, or data, or portions thereof, can be stored in the remote computer 150, such as in the disk drive 152. Those skilled in the relevant art will readily recognize that the network connections shown in FIG. 1 are only some examples of establishing communication links between computers, and other links may be used, including wireless links.

Figure 2:
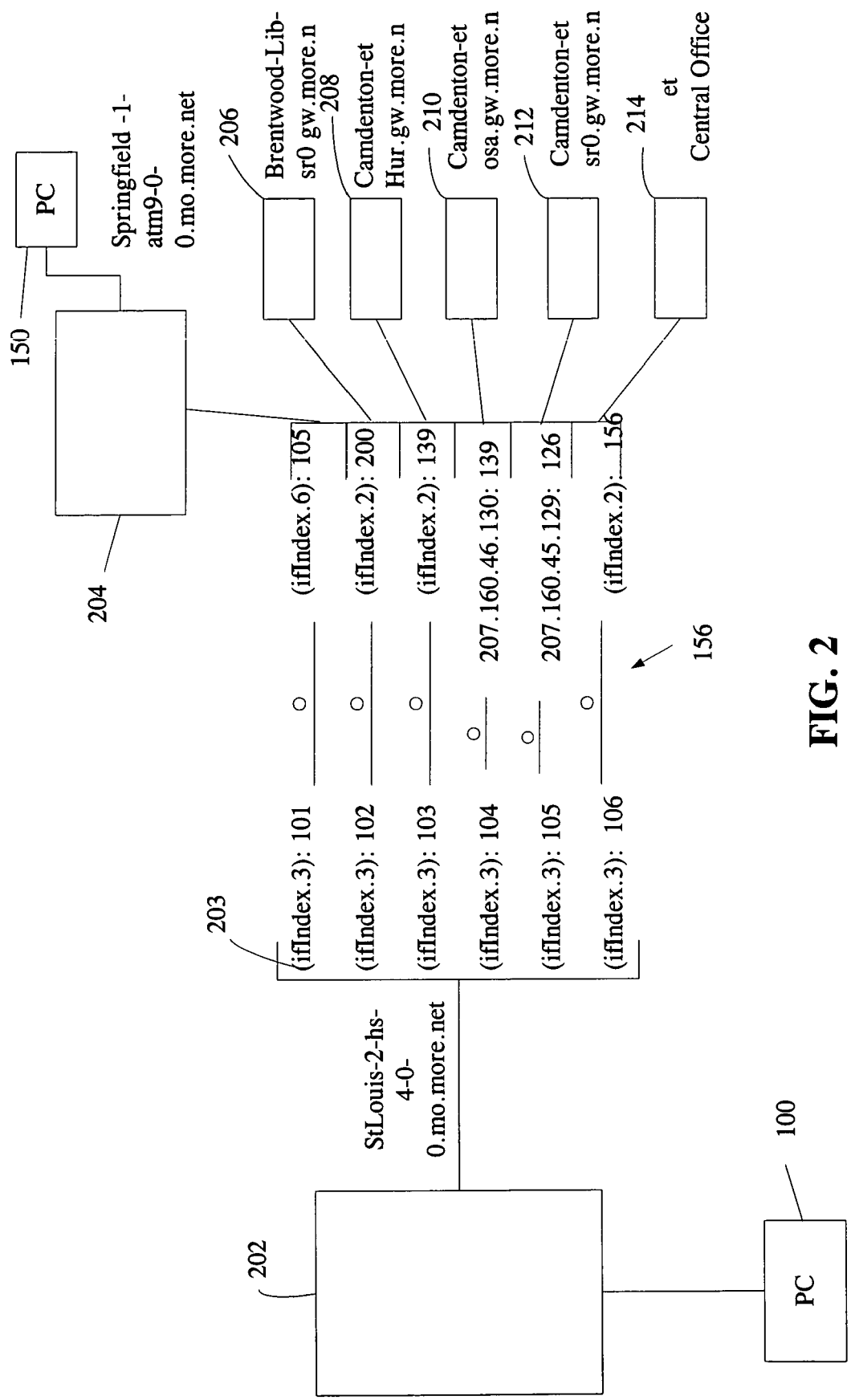
FIG. 2 is a block diagram of a computer network analyzed by the facility.

Referring to FIG. 2, a block diagram shows a portion of the WAN 156. The personal computer 100 is coupled to a router 202, which in mm is coupled to six dedicated frame relay circuits 203. A network manager purchases the six circuits 203 from, e.g., a telephone company, which are configured into the router 202 using data link circuit identifier (DLCI) numbers. For example, the router may have an address of "StLouis-2-hs-4-0-0.mo.more.net," and the six frame relay ports have DLCIs (ifIndex.3): 101 through (ifIndex.3): 106. Opposite ends of each frame relay circuit 203 are coupled to one port on routers 204 through 214, where each router is at a different location. These six frame relay ports have DLCIs of, e.g., (ifIndex.6): 105, (ifIndex.2): 200, (ifIndex.2): 139, 207.160.46.130:139, 207.160.45.129: 126 and (ifIndex.2): 156. The router 202, however, has no information of the actual connections of each circuit 203 to each router 204 through 214; the telephone company coordinates such connections. The router 202 simply does not have any information regarding which of its ports are connected to which frame relay ports of the remote routers 204 through 214.

As explained more fully below, components in or associated with the router 202 monitor nodes or components in the network. For example, a network management card plugged into a switching hub (not shown) may monitor certain circuits of the network. On other circuits, the personal computer 100 passively monitors all communications over the circuits 203. Under the invention, any network monitoring device may be used to count and/or collect information about their performance and utilization of circuits, segments, components and nodes within the network. Such devices support a standard protocol, such as MIB (Management Information Base), which defines a convention for identifying and requesting the contents of specific counters that are maintained or monitored by the device. Such counters are identified by corresponding MIB variables. When the monitoring device requests an MIB variable of a particular value, the contents of the corresponding counters are supplied to the device. Communications of requests and corresponding replies are also handled under a standard protocol, such as SNMP (simple network management protocol). Of course, other protocols besides MIB and SNMP may be employed under the invention.

Utilization and performance statistics gathered by the personal computer 100 include, among other data, the number of bytes transferred, the number of collisions, the number of errors (e.g., Ethernet errors, token ring hard errors, token ring soft errors), broadcast and multi-task utilizations, and so forth. Each monitoring, device stores such statistics internally in corresponding counters. Thus, each monitoring device has a dedicated counter that records the total number of bytes that have been transferred over a particular segment since some initialization time at which the count began. The computer 100 periodically polls network monitors throughout the network for specific data. When sent back to the computer 100, the data is stored within the system memory 104. Using such polled data, the personal computer 100 can identify statistical fingerprints and match starting and ending ports for frame relay circuits to match port pairs.

Figure 3:
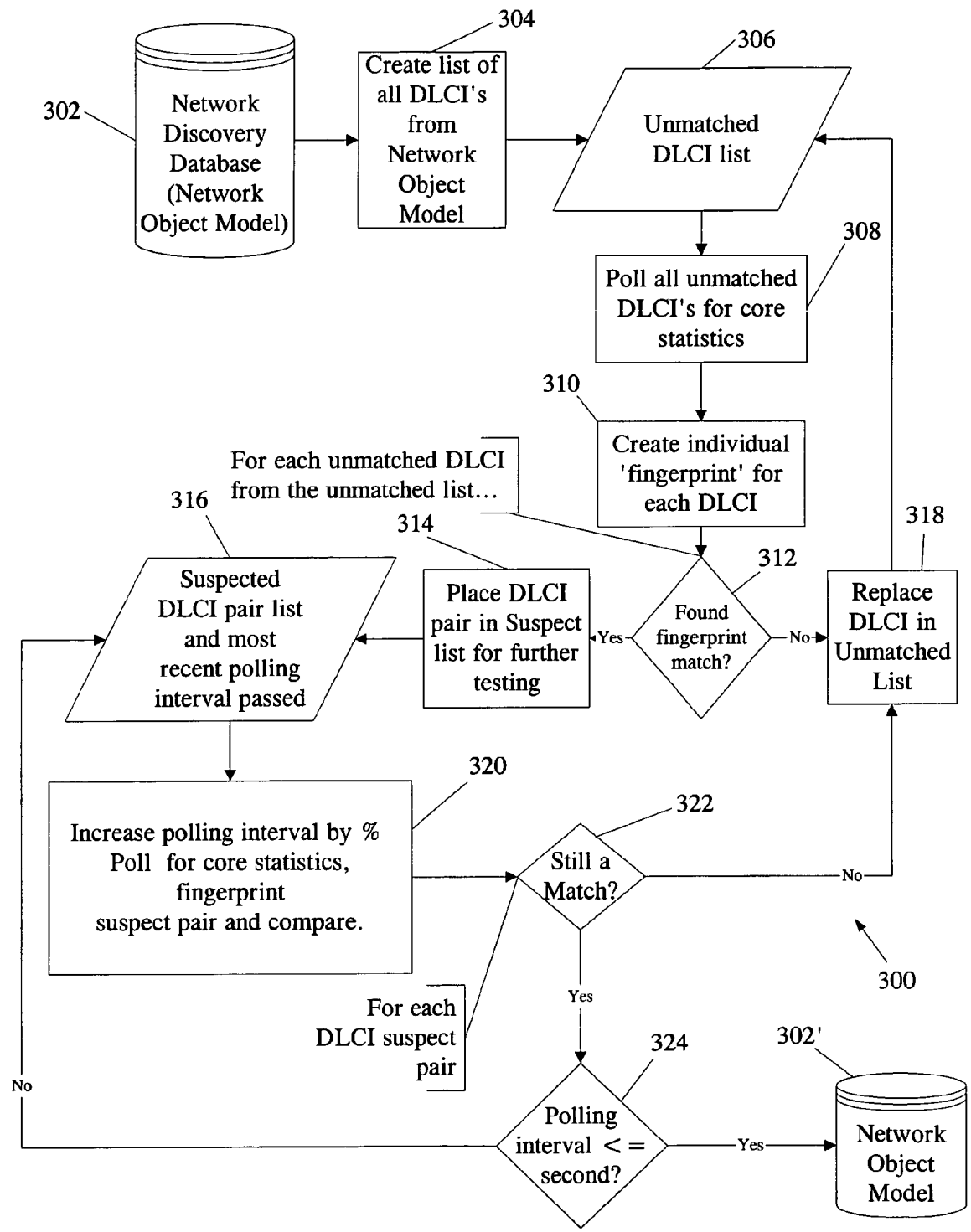
FIG. 3 is a flowchart depicting the facility for analyzing a network under an embodiment of the invention.

Referring to the flowchart of FIG. 3, a routine or facility 300 performed by all or part of the computer 100 receives data from a database of logical network configurations and analyzes the network. Unless described otherwise herein, the steps depicted in FIG. 2 are generally well known, or those skilled in the relevant art can create source code, microcode or program logic arrays or firmware for such steps, based on the detailed description provided herein. All or part of the facility 200 can be stored in the system memory 104 and/or non-volatile memory such as the magnetic disk 122.

Beginning in step 302, the facility 300 obtains a model of logically connected elements such as a database of network components, their connections, configurations and associated information. In one embodiment, the facility 300 obtains a database produced under an automated network interrogation facility. One example of such an interrogation facility is AutoDiscovery technology by Visio Corporation of Seattle, Wash. The AutoDiscovery technology, without network interruption, begins at a single router in a network and builds a comprehensive database of the network including both device and connectivity information, at both LAN and enterprise levels. More details on the AutoDiscovery technology can be found, for example, in *Modeling in Visio Enterprise*, User Manual, 1998, by Visio Corporation.

The database may be stored, for example, in the hard disk drive 114, or the disk drive 152, shown in FIG. 1. The computers that may run the facility 300 need not necessarily be connected to the network to perform the network analysis described herein, but instead receive network data from data storage devices or manually. Thus, while the computer 100 is shown in FIG. 1 as being connected to the WAN 156, the example described below applies to any network independent of the computer 100.

Importantly, the computer 100 receives data identifying every device in the WAN156, such as under the AutoDiscovery technology noted above, where such data includes information on frame relay circuits in the network. As used generally herein, "frame relay circuits" includes any network paths, segments or components whose configuration cannot be automatically identified using existing AutoDiscovery or similar technology, such as virtual private network segments. As shown in FIG. 3, the facility 300 receives as input a network object model database 302 that contains information about every device within the WAN 156. Thus, the database 302 includes information about the router 202 including a router port therein having frame relay capability, and the six DLCIs 203 associated with that port. As noted above, each DLCI is similar to a single direction data flow segment where data can flow into or out of the segment. Each DLCI is associated with either a front or initiating end of the segment, or a terminating or back end of the segment. The database 302 also includes the DLCIs for the routers 204 through 214, but includes no information about which DLCIs for the routers are associated with the DLCIs of the router 202. Since, for example, the router 202 has no information about the other end of the DLCIs 203, the AutoDiscovery technology cannot determine which DLCIs are connected to other DLCIs in the WAN156.

In step 304, the facility 300 examines the database 302 to extract a list of all frame relay circuits within the database. An enterprise network rarely contains frame relay circuits that do not terminate within the scope of the network. Therefore, the facility 300 assumes all DLCIs for frame relay circuits were previously identified under the AutoDiscovery process and are stored in the database 302. The facility 300 thus creates a list 306 of all unmatched DLCIs.

In step 308, the facility 300 polls each individual DLCI in the unmatched list 306 for core statistics that the facility uses to create statistical fingerprint data associated with each DLCI.

Under step 308, the facility 300 uses standard SNMP commands to poll devices such as the routers 202 through 214 for certain core statistics. Such core statistics are stored in MIBs within each router device containing DLCIs. In most circumstances, where the WAN 156 includes numerous nodes, many routers or other devices must be polled by the facility 300 for the facility to gather the core statistics for all DLCIs. The facility 300, under step 308, establishes a polling interval of at least 15 minutes, and in one embodiment is established at 30 minutes. Thus, the facility 300 polls each router having an associated DLCI once to obtain starting values for each core statistic, and then again 30 minutes later for the same statistics. The facility 300 then determines a change in the core statistics from the starting and ending values during the 30 minute polling period.

The facility 300 employs several inverse pairs of statistics to create statistical fingerprints for each DLCI. Otherwise, if only a single statistic were employed, random matches between unmatched DLCIs could arise. Typically, the core statistics at one end of a DLCI will match the inverse core statistics at the other end of the circuit indicating a match. For example, one DLCI reports 2.43 megabytes transmitted while another DLCI reports the same number of bytes received during the polling interval. Similarly, the same DLCI reports 3 send errors, which the other DLCI reports 3 receive errors. The facility 300 initially assumes that the number of bytes sent down one end of the frame relay circuit (associated with one DLCI) will closely match the number of bytes coming out or received at the other end (associated with another DLCI), taking into account data loss through the public switch telephone network. Likewise, the facility 300 assumes the number of errors received at one end of the DLCI will match the number of send errors at the other DLCI. In step 310, the facility 300 creates individual statistical fingerprints for each DLCI by aggregating a predetermined set of core statistics during the polling interval for each DLCI. Such set of core statistics, under one embodiment, includes number of bytes sent/received, number of send/receive errors, and so forth.

In step 312, the facility 300 compares all statistical fingerprints for unmatched DLCIs in the list 306 for matches. If the facility 300 finds a suspected match, then in step 314, the facility places the suspected DLCI matching pair on a suspected pair list 316, and removes the pair from the unmatched list 306. Under step 318, the facility 300 replaces any DLCIs that fail to match in step 312 back into the unmatched list 306.

The facility 300 can employ one or more thresholds to determine matches between statistical fingerprints for DLCIs. For example, the facility 300 may permit a match under step 312 despite differences in transmitted/received bytes of plus or minus 1 kilobyte or differences in plus or minus 1 send/receive error for send/receive error statistics.

In an alternative embodiment, the facility 300 automatically adjusts all thresholds employed in step 312. In an initial iteration through steps 306, 310, 312, 314, 316 and 318, the facility 300 requires identical statistical fingerprints between DLCIs for a match to be declared in step 312. The facility 300 then reviews the suspected pair list 316 to see if all DLCIs from the unmatched list 316 are now on the suspected pair list. If not, then the facility 300 adjusts the thresholds by permitting a small standard deviation to exist in only one of the statistics in the set of core statistics to deviate for a match to be declared. Again, if the facility 300 determines that a large number of DLCIs still exist on the unmatched 316, then the facility 300 increases the thresholds under additional iterations of the steps 308 through 318.

It is possible that the facility 300 will fail to match two or more DLCIs in the list 306. One reason for failing to match DLCIs would be that the statistical fingerprints are invalid, which could occur when an insufficient amount of data was collected during the polling interval. By replacing DLCIs back on the list 306 (under step 318), additional statistical data can be collected for such DLCIs.

The suspected pair list 316 represents those DLCIs that potentially match, but require further testing to ensure such DLCIs do in fact match. For example, while the statistical fingerprint data gathered under steps 308 and 310 is sufficient to correctly match DLCIs 95% of the time, the facility 300 requires additional testing to ensure DLCIs are correctly match 99.99% of the time or greater. Thus, in step 320, the facility 300 performs at least one verification step. Under step 320, the facility 300 polls the suspected DLCI pair in sequence to (or adjacent in time) to obtain data from appropriate counters as contemporaneously as possible.

A problem the facility 300 faces is that when first polling DLCIs in the WAN 156, the facility may poll one DLCI at time X, and then the matching DLCI at some later time, X+n. In the time interval n, more data has passed through the frame relay circuit between such DLCIs, so that the counters on the second DLCI will not match the counters of the first DLCI, which is known as statistical skew. A longer polling cycle is employed under step 308 to help eliminate statistical skew, while a shorter polling cycle is preferred under step 320. For example, the polling interval is shortened by a percentage such as 50%. If the original polling interval was 30 minutes, then during a first iteration through step 320, the polling interval is reduced to 15 minutes. By reducing the polling interval for each suspected DLCI pair, a tight or nearly statistical fingerprint may be obtained with the skew time interval and reduced to as close to zero as possible. By reducing the skew time value end to as close to zero, the facility 300 approaches perfect test conditions.

In step 322, the facility 300 compares the new statistical fingerprints for each pair of DLCIs obtained in the shortened polling interval. If the fingerprints do not match within the threshold, then the facility 300 determines that the DLCI pair does not match, and the DLCIs are placed back on the unmatched list 306. If the DLCIs still match, then in step 324, the facility 300 determines whether the polling interval has fallen below a predetermined threshold, such as one second. If not, then the facility 300 loops back to step 320 and the polling interval is reduced again by, for example, 50%. The steps 320 through 324 are repeated until the polling interval is reduced below one second.

If the starting polling interval were 30 minutes, then 12 passes or iterations through these steps would be required, which would be approximately one hour in duration. If an initial polling interval of only 15 minutes were selected under step 308, then the entire facility 300 can be performed in approximately 30 minutes.

If pairs of DLCIs still match after the polling interval is decreased to less than one second, then each DLCI pair is considered matched. The facility 300 then updates the network object model database to correctly note such DLCI pairs (shown as network object model 302' in FIG. 3). Thus, the facility 300 determines that the starting DLCI (ifIndex.3): 101 is paired with the DLCI (ifIndex.6): 105, that the DLCI (ifIndex.3): 102 is paired with the DLCI (ifIndex.2): 200, and so forth as shown in FIG. 2.

Embodiments of the invention may be constructed using a variety of programming paradigms and tools, including well known approaches such as MICROSOFT ActiveX objects, MICROSOFT Automation, and the Common Object Request Broker Architecture ("CORBA"), used by companies such as IBM, Sun, and Apple. As is well known, CORBA allows objects from one program to communicate with objects in other programs even if the two programs are written in different programming languages and run on different computing platforms. The inventive method and facility may be produced using any computing language, such as C, C++, Visual Basic ("VB"), Visual Basic Script ("VBScript"), Java, or JavaScript. Similarly, the inventive method and system may be developed according to an object-oriented programming methodology or using any other programming methodology that results in a computing facility having equivalent functionality.

The invention is not limited to any particular operating system and may be used in computers having operating systems such as the WINDOWS operating system, Unix, Linux, OS/2, and the Macintosh operating system ("Mac OS"). The invention is not limited to any particular type of user interface and is suitable for operation with a user interface designed using the "what-you-see-is-what-you-get" ("WYSIWYG") display paradigm. One skilled in the art may easily recognize numerous alternative approaches to providing a user interface to receive the information needed to produce a diagram of a model.

The WAN 156 or LAN 154 may include wireless communications segments that are identified under embodiments of the invention. Thus, communications between aspects of the invention (e.g., communications between the computer 100 and the remote computer 150) may be conducted over both a wireless communications system and a wired communications system.

The above description of embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings provided herein of the invention can be applied to other networks, not necessarily the computer network described above.

The various embodiments described above can be combined to provide further embodiments. All of the above U.S. patents and applications and User Manuals are incorporated herein by reference in their entireties. Aspects of the invention can be modified, if necessary, to employ the systems and concepts of the various patents and applications described above to provide yet further embodiments of the invention.

These and other changes can be made to the invention in light of the above detailed description. These and other changes can be made to the invention in light of the above detailed description. In general, in the following claims, the terms used should not be construed to limit the invention to the specific embodiments disclosed in the specification and the claims, but should be construed to include all systems for system analysis that operate under the claims to provide a method for efficiently diagramming such models. Accordingly, the invention is not limited by the disclosure, but instead the scope and definition of the invention is determined entirely by the following claims.

What is claimed is:

1. A computer controlled method of analyzing a network, wherein the network has a plurality of network segments, the method comprising:
   identifying segment addresses of virtual private network segments in the network, wherein pairs of segment addresses define individual virtual private network segments;
   obtaining statistical data associated with each identified segment address in the network, the statistical data representing more than one type of statistic obtained from each identified segment address; and
   analyzing the obtained statistical data to identify similar statistical data corresponding to the pairs of segment addresses wherein the step of analyzing the obtained statistical data further comprises the steps of:
   identifying potential pairs of segment addresses;

obtaining refined statistical data associated with the identified potential pairs of segment addresses; and confirming that the potential pairs of segment addresses are the pairs of segment addresses based on the obtained refined statistical data.

2. The method of claim 1, wherein the step of obtaining statistical data associated with each identified segment address in the network, further comprises the step of creating a statistical fingerprint for each identified segment address.

3. The method of claim 2, wherein each statistical fingerprint comprises inverse pairs of statistics.

4. The method of claim 2, wherein the step of creating statistical fingerprints further comprises the step of aggregating a predetermined set of core statistics.

5. The method of claim 4, wherein the core statistics comprises at least one of number of bytes sent/received and number of send/receive errors.

6. The method of claim 1, wherein the statistical data comprises at least one of number of bytes sent/received and number of send/receive errors.

7. The method of claim 1, wherein the step of obtaining statistical data associated with each identified segment address further comprising the step of polling network devices containing segment addresses during a predetermined interval.

8. The method of claim 7, wherein each network device comprises a router.

9. The method of claim 7, wherein each segment address comprises a data link circuit identifier.

10. The method of claim 1, wherein each segment address comprises a data link circuit identifier.

11. A computer-readable medium having computer-executable instructions for performing the steps recited in claim 1.

12. A computer controlled method of analyzing a network, wherein the network has a plurality of network segments, the method comprising:

receiving segment addresses of selected network segments in the network, wherein each segment includes at least a portion spanning a public switched network and wherein each selected network segment is defined by pairs of segment addresses;

obtaining statistical data associated with each identified segment address in the network, the statistical data representing different types of statistics;

analyzing the obtained statistical data to identify similar statistical data;

identifying the pairs of segment addresses corresponding to the selected network segments, based on the identified similar statistical data;

obtaining refined statistical data associated with the identified pairs of segment addresses;

confirming that the pairs of segment addresses are the pairs of segment addresses based on the obtained refined statistical data; and storing the pairs of segment addresses in a database.

13. A computer system for analyzing a network, wherein the network has a plurality of network segments, comprising:

a component for identifying segment addresses of virtual private network segments in the network, wherein pairs of segment addresses define individual virtual private network segments;

a component for obtaining statistical data associated with each identified segment address in the network, the statistical data representing more than one type of statistic obtained from each identified segment address; and a component for analyzing the obtained statistical data to identify similar statistical data corresponding to the pairs of segment addresses, the analyzing including:

identifying potential pairs of segment addresses;

obtaining refined statistical data associated with the identified potential pairs of segment addresses; and confirming that the potential pairs of segment addresses are the pairs of segment addresses based on the obtained refined statistical data.

14. The computer system of claim 13 further comprising a component for storing the pairs of segment addresses in a database.

15. The computer system of claim 13 wherein the obtaining statistical data associated with each identified segment address in the network, further comprises creating a statistical fingerprint for each identified segment address.

16. The computer system of claim 15, wherein each statistical fingerprint comprises inverse pairs of statistics.

17. The computer system of claim 15, wherein the creating of statistical fingerprints further comprises aggregating a predetermined set of core statistics.

18. The computer system of claim 17, wherein the core statistics comprises at least one of number of bytes sent/received and number of send/receive errors.

19. The computer system of claim 13, wherein the statistical data comprises at least one of number of bytes sent/received and number of send/receive errors.

20. The computer system of claim 13, wherein the obtaining of statistical data associated with each identified segment address further comprising polling network devices containing segment addresses during a predetermined interval.

21. The computer system of claim 20, wherein each network device comprises a router.

22. The computer system of claim 20, wherein each segment address comprises a data link circuit identifier.

23. The computer system of claim 13, wherein each segment address comprises a data link circuit identifier.

* * * * *